(12) United States Patent
Amako et al.

(10) Patent No.: US 6,369,185 B1
(45) Date of Patent: Apr. 9, 2002

(54) CURABLE ORGANOPOLYSILOXANE COMPOSITION, CURED PRODUCTS FORMED THEREFROM AND UNIFIED ARTICLES

(75) Inventors: Masaaki Amako; Tadashi Okawa; Kazumi Nakayoshi; Osamu Mitani, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/531,934

(22) Filed: Mar. 21, 2000

(30) Foreign Application Priority Data

Mar. 31, 1999 (JP) .............................. 11-090577

(51) Int. Cl.[7] ...................... C08G 77/04; C08G 77/06; C08G 77/08; C08G 77/12; C08G 77/14; C08G 77/20; C08G 77/22

(52) U.S. Cl. .............................. 528/15; 528/25; 528/29; 528/31; 528/32; 528/33

(58) Field of Search .............................. 528/15, 31, 32, 528/33, 25, 29; 428/447

(56) References Cited

U.S. PATENT DOCUMENTS 3,220,972 A  * 11/1965 Lamoreaux ................. 528/15
4,952,657 A  *  8/1990 Riding et al. ................. 528/27
5,378,789 A  *  1/1995 Raleigh et al. ............... 528/29
5,661,202 A  *  8/1997 Akamatsu et al. .......... 524/265

FOREIGN PATENT DOCUMENTS

| EP | 0444960 | * | 9/1991 | |
| JP | 2519563 |   | 8/1989 | ........... C08L/83/07 |
| JP | 2027756 |   | 1/1990 | ........... H01L/23/36 |
| JP | 04004212 | * | 1/1992 | |
| JP | 05059175 | * | 3/1993 | |
| JP | 10278538 |   | 10/1998 | ............. B60H/1/00 |

* cited by examiner

Primary Examiner—Harold Pyon
Assistant Examiner—Elena Tsoy
(74) Attorney, Agent, or Firm—Larry A. Milco

(57) ABSTRACT

A curable organopolysiloxane composition, comprising (A) an organopolysiloxane containing an average of at least 2 alkenyl groups and at least 2 silicon-bonded hydrogen atoms per molecule; (B) a compound containing alkenyl and hydroxyphenyl groups in each molecule, and (C) a hydrosilylation catalyst. A product formed by curing the organopolysiloxane composition and a unified article comprising a substrate and a product formed by curing the organopolysiloxane, wherein the substrate is unified into a single integral body with the cured product.

17 Claims, 1 Drawing Sheet

CURABLE ORGANOPOLYSILOXANE COMPOSITION, CURED PRODUCTS FORMED THEREFROM AND UNIFIED ARTICLES

FIELD OF THE INVENTION

This invention relates to a curable organopolysiloxane composition and more particularly to a curable organopolysiloxane composition that exhibits excellent curability. The present invention also relates to a product formed from the organopolysiloxane composition and to a unified article.

BACKGROUND OF THE INVENTION

Addition-curing organopolysiloxane compositions (abbreviated below as ACO compositions) typically comprise an alkenyl-functional organopolysiloxane and an organohydrogenpolysiloxane and cure in the presence of a platinum catalyst. These compositions are used in a variety of industrial and commercial sectors. However, their cured products have an inert surface that also exhibits release properties and, consequently, these cured products have very poor adhesion to thermosetting organic resins such as phenolic resins, epoxy resins, melamine resins, urea resins, polyurethane resins, and polyimide resins. In one method proposed for the formation of composites from thermosetting organic resins and ACO compositions, the surface of the cured ACO composition is treated with ozone and the organic resin is brought into contact with the treated surface and cured (Japanese Laid Open (Kokai or Unexamined) Patent Application Number Hei 2-27756 (27,756/1990)). However, this method has not proven satisfactory because the adhesion between the organic resin and cured ACO declines with the passage of time.

In order to solve this problem, the present inventors have previously proposed a curable composition comprising an alkenyl-functional organopolysiloxane, an organohydrogensiloxane, a hydroxyphenyl group-containing methacryl-functional siloxane, and a hydrosilylation catalyst (Japanese Patent Application Number Hei 10-278538 (278,538/1998)). Unfortunately, when this curable composition is applied and cured on the surfaces of various substrates, very small amounts of the silicone component out-migrate or effuse from the periphery of the composition prior to and during its cure. One problem associated with this effusion is that the out-migrated fraction does not adhere to substrates. Another problem occurs when such a composition is used as the base of a silicone system adhesive that is employed for bonding semiconductor chips to their substrate or package. In this case, the very small amount of silicone component that spreads out from the silicone system adhesive prior to its thermosetting will bleed out at the periphery of the semiconductor chip, resulting in contamination of the surface of the semiconductor chip, substrate, package, lead frame, and so forth. This contamination results in problems such as a decrease in wire bondability and the generation of bonding defects with the sealant resin, which can lead to reduced moisture resistance.

As a result, there is a need for a curable organopolysiloxane composition wherein the silicone component that out-migrates by effusion from the composition is also highly curable and adherent to a variety of substrates.

In another vein, ACO compositions comprising a hydrosilylation catalyst and an organopolysiloxane containing both SiH and alkenyl groups in the same molecule are known (Granted Japanese Patent 2,519,563 and Japanese Laid Open (Kokai or Unexamined) Patent Application Number Hei 1-213363 (213,363/1989)). The cured products afforded by the thermosetting of these compositions are reported to contain less uncured material than the cured products from compositions comprising an alkenyl-functional organopolysiloxane and an organohydrogensiloxane. However, due to their low SiH/alkenyl molar ratio, these compositions can only be cured to give gels—which cannot be used for bonding applications due to their very low physical strength.

SUMMARY OF THE INVENTION

The present inventors have discovered that an organopolysiloxane composition comprising an organopolysiloxane containing both silicon-bonded hydrogen atoms (SiH) and alkenyl groups in the same molecule has excellent curability. In particular, the silicone component that out-migrates from the organopolysiloxane composition by effusion has excellent curablility. Also, the organopolysiloxane composition contains a compound having both alkenyl and hydroxyphenyl groups as an adhesion promoter and has excellent adhesion to a wide variety of substrates.

In specific terms, it is an object of this invention to provide a curable organopolysiloxane composition that cures rapidly on the surface of a variety of substrates. It is also an object of this invention to provide a curable organopolysiloxane composition wherein the silicone fraction that outmigrates by effusion from the composition prior to and during cure is also highly curable and adherent to a variety of substrates. Another object of this invention is to provide products afforded by curing the aforesaid composition. A further object of this invention is to provide articles in which said cured product and a substrate are unified into a single body (unified articles).

The present invention is directed to a curable organopolysiloxane composition, comprising:

(A) an organopolysiloxane containing an average of at least 2 alkenyl groups and at least 2 silicon-bonded hydrogen atoms per molecule;

(B) a compound containing alkenyl and hydroxyphenyl groups in each molecule, and (C) a hydrosilylation catalyst.

The present invention is also directed to a product formed by curing the aforementioned organopolysiloxane composition.

The present invention is further directed to a unified article comprising a substrate and a product formed by curing the above organopolysiloxane, wherein the substrate is unified into a single integral body with the cured product.

A characteristic feature of the curable organopolysiloxane composition of this invention is that the very small amount of silicone component that effuses from the composition also undergoes a thorough cure when the composition coated on the substrate surface is heated. This results in the production of a unified article in which the cured product is solidly bonded with the substrate. This characteristic feature makes the composition of this invention well suited for use as, for example, a silicone system adhesive.

The curable organopolysiloxane composition of this invention, because it comprises the components (A), (B), and (C) as described hereinabove, is characterized by an excellent curability, and in particular the silicone component that out-migrates in a very small amount by effusion from the composition prior to and during its cure is also highly curable and produces a cured product that can tightly adhere to a variety of substrates.

These and other features, aspects, and advantages of the present invention will become better understood with reference to the following description, appended claims, and accompanying drawing.

DETAILED DESCRIPTION OF THE INVENTION

Figure 1:
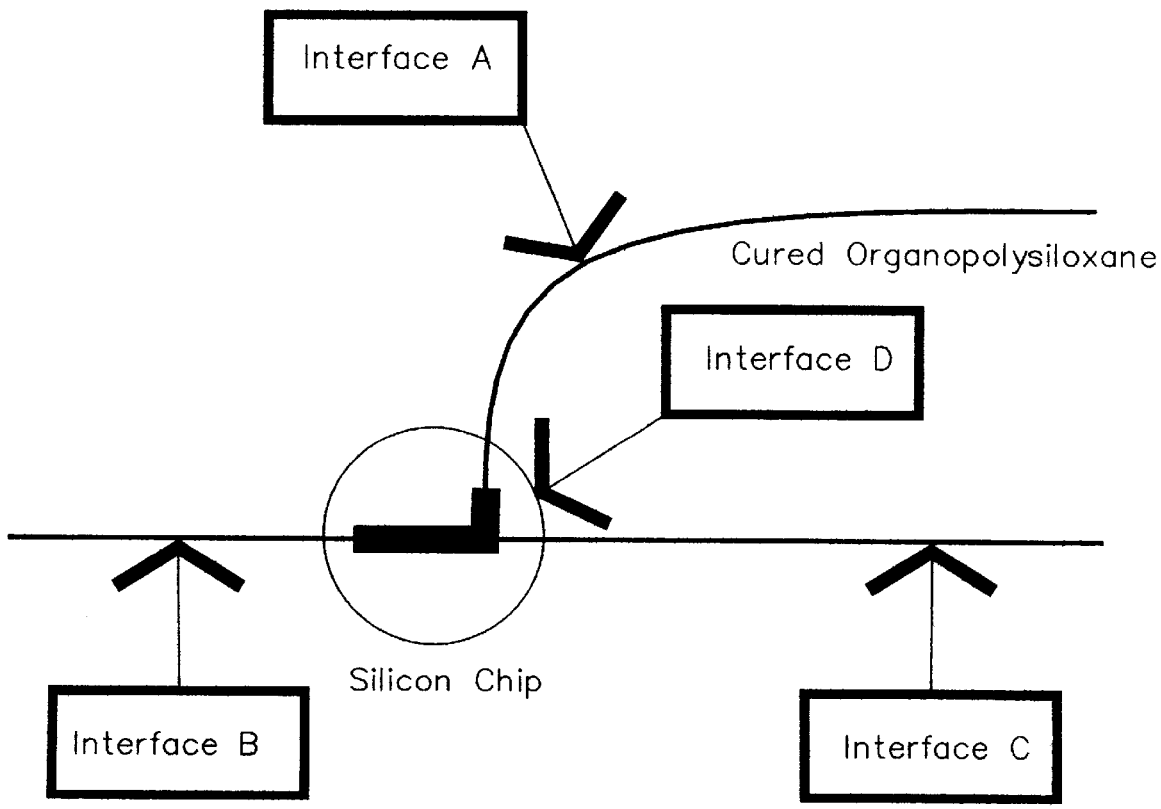
FIG. 1 shows an enlarged cross section of a region in a unified article where all three materials—a cured organopolysiloxane, a silicon chip, and a epoxy resin—come into contact with each other.

A curable organopolysiloxane composition according to the present invention comprises:

(A) an organopolysiloxane containing an average of at least 2 alkenyl groups and at least 2 silicon-bonded hydrogen atoms per molecule;

(B) a compound containing alkenyl and hydroxyphenyl groups in each molecule, and (C) a hydrosilylation catalyst.

Component (A) of this invention is an organopolysiloxane containing an average of at least 2 alkenyl groups and at least 2 silicon-bonded hydrogen atoms (SiH) per molecule. This organopolysiloxane, however, may not contain the hydroxyphenyl group. With regard to chemical structure, this organopolysiloxane may be straight chain, cyclic, or network and may range from an oligomer up to and including high molecular weight polymers. Based on ease of blending with component (B), component (A) is preferably a liquid organopolysiloxane having a viscosity of from 100 to 1,000,000 mPa·s at 25° C. and a straight chain or branched molecular structure. The alkenyl groups and silicon-bonded hydrogen atoms in the organopolysiloxane (A) may be located at terminal or pendant positions on the molecular chain. Examples of alkenyl groups include, but are not limited to, vinyl, allyl, propenyl, butenyl, pentenyl, hexenyl, heptenyl, octenyl, nonenyl, and decenyl. Other examples are alkenyl-functional groups such as methacryloxypropyl and acryloxypropyl. With respect to the position of the double bond in the alkenyl group, it is preferably at the terminal position distal to the alkenyl group-bearing silicon atom due to the high reactivity this affords in an addition reaction.

The content of silicon-bonded alkenyl groups in organopolysiloxane (A) is preferably from 0.025 to 5 mole % and more preferably from 0.1 to 1.2 mole %. The silicon-bonded hydrogen atom content is preferably from 0.025 to 5 mole % and more preferably from 0.15 to 2.5 mole %. The ratio of silicon-bonded hydrogen atoms to alkenyl groups in component (A) is generally in the range from 0.1 to 200, preferably from 0.3 to 20, more preferably from 1 to 10, and most preferably from 2 to 7, The curability of the composition of this invention declines when this ratio is below 0.1, while the physical properties of the ultimately obtained cured product decline when this ratio exceeds 200.

The silicon-bonded organic groups present in organopolysiloxane (A) in addition to the alkenyl groups and silicon-bonded hydrogen atoms are preferably monovalent hydrocarbon groups. These groups are exemplified by alkyl such as methyl, ethyl, propyl, butyl, pentyl, and hexyl; aryl such as phenyl, tolyl, and xylyl; and aralkyl such as benzyl and phenethyl. In addition, small amounts of hydroxyl, alkoxy, haloalkyl, and so forth may be present within a range that does not impair the objects of this invention. When such factors as economics and ease of acquisition are taken into consideration, methyl preferably makes up at least half of the silicon-bonded organic groups. The organopolysiloxane (A) as described hereinabove can be synthesized by known equilibration polymerization reactions using acid catalysts.

Examples of organopolysiloxanes include, but are not limited to the following:

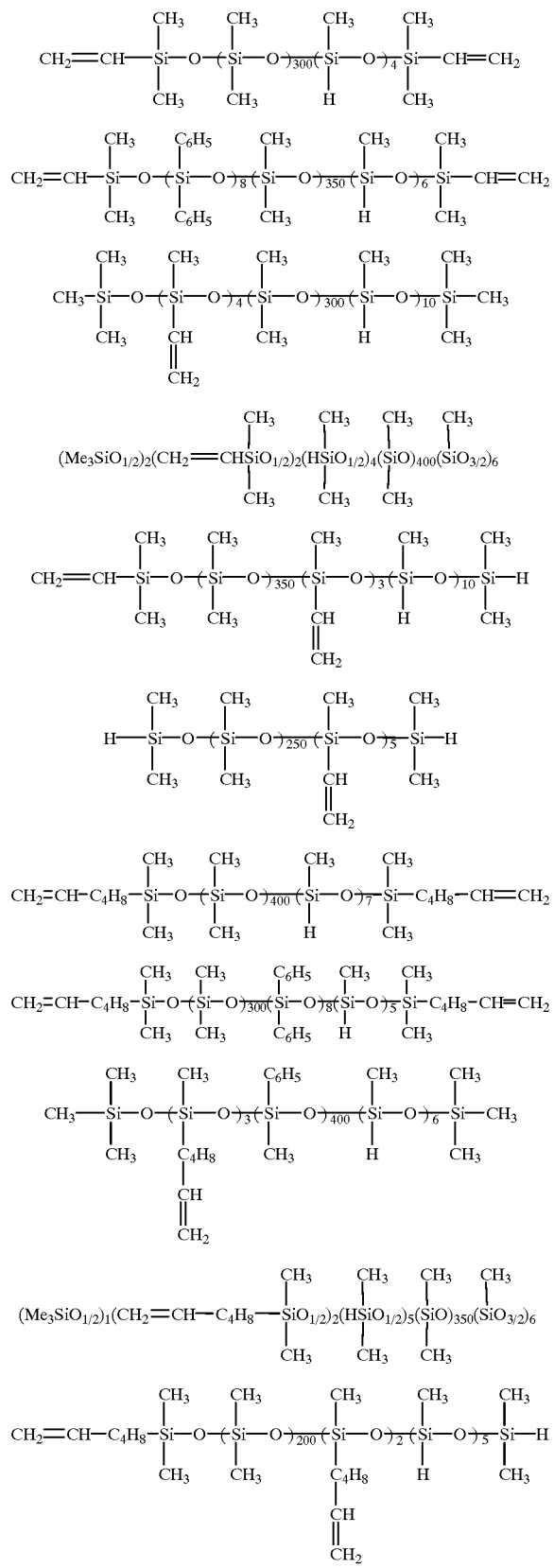

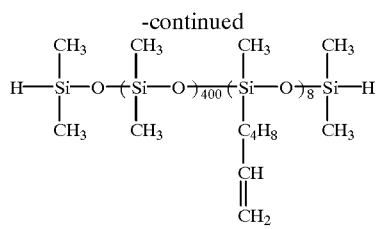

Component (B) of the present invention is a compound containing both alkenyl and hydroxyphenyl groups in each molecule. This compound is exemplified by such aliphatically unsaturated phenols as 2-allylphenol, eugenol, ortho-eugenol, and 4-allyl-2,6-dimethoxyphenol. Component (B) is further exemplified by an organosilicon compound having the following formula:

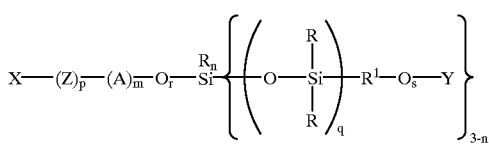

wherein X is an alkenyl group; Z is an ester group or a phenylene group; A is a divalent hydrocarbon group containing at least 1 carbon atom or a group having the formula —$R^2$—O—$R^2$— wherein $R^2$ is a divalent hydrocarbon group; each R is independently a monovalent hydrocarbon group free of aliphatic unsaturation; each $R^1$ is independently a divalent hydrocarbon group free of aliphatic unsaturation and containing at least 2 carbon atoms; Y is a substituted or unsubstituted hydroxyphenyl group; m, p, r, and s are each 0 or 1; n is 0 to 2; and q is an integer from 0 to 7.

Examples of alkenyl groups represented by X include, but are not limited to, vinyl, allyl, isopropenyl, and hexenyl. The ester group represented by Z has the formula —C(=O)—O—. The phenylene groups represented by Z can be, for example, o-phenylene, m-phenylene, or p-phenylene. The group A is specifically exemplified by ethylene, propylene, butylene, hexylene, ethyleneoxypropylene, and phenyleneoxypropylene. Examples of divalent hydrocarbon groups represented by $R^2$ include, but are not limited to, alkylene and arylene.

Examples of monovalent hydrocarbon groups represented by R include, but are not limited to, alkyl such as methyl, ethyl, butyl, pentyl, and hexyl; aryl such as phenyl, tolyl, and xylyl; and aralkyl such as benzyl and phenethyl. Divalent hydrocarbon groups represented by $R^1$ include, but are not limited to, alkylene such as ethylene, propylene, butylene, and hexylene; and arylene such as phenylene.

Substituted hydroxyphenyl groups represented by Y are exemplified by alkyl-substituted hydroxyphenyl groups and alkoxy-substituted hydroxyphenyl groups. The alkyl substituent in Y is exemplified by methyl, ethyl, propyl, and butyl, while the alkoxy substituent in Y is exemplified by methoxy, ethoxy, propoxy, and butoxy. The bonding positions of the hydroxyl, alkyl, and alkoxy in this hydroxyphenyl group are not critical. Alkyl-substituted hydroxyphenyl groups are exemplified by 3,5-di-tert-butyl-4-hydroxyphenyl and 3-methyl-4-hydroxyphenyl. Alkoxy-substituted hydroxyphenyl groups are exemplified by 4-hydroxy-3-methoxyphenyl and 3,5-dimethoxy-4-hydroxyphenyl.

Unsubstituted hydroxyphenyl groups represented by Y are exemplified by 2-hydroxyphenyl, 4-hydroxyphenyl, 3,4-dihydroxyphenyl, and 3,5-dihydroxyphenyl.

Y is preferably 2-hydroxyphenyl or 4-hydroxy-3-methoxyphenyl, considering ease of acquisition.

In the preceding formula of the organosilicon compound, the subscript n is preferably from 1 to 2 and q is preferably from 0 to 4.

Examples of compounds containing both alkenyl and hydroxyphenyl groups include, but are not limited to, the following compounds:

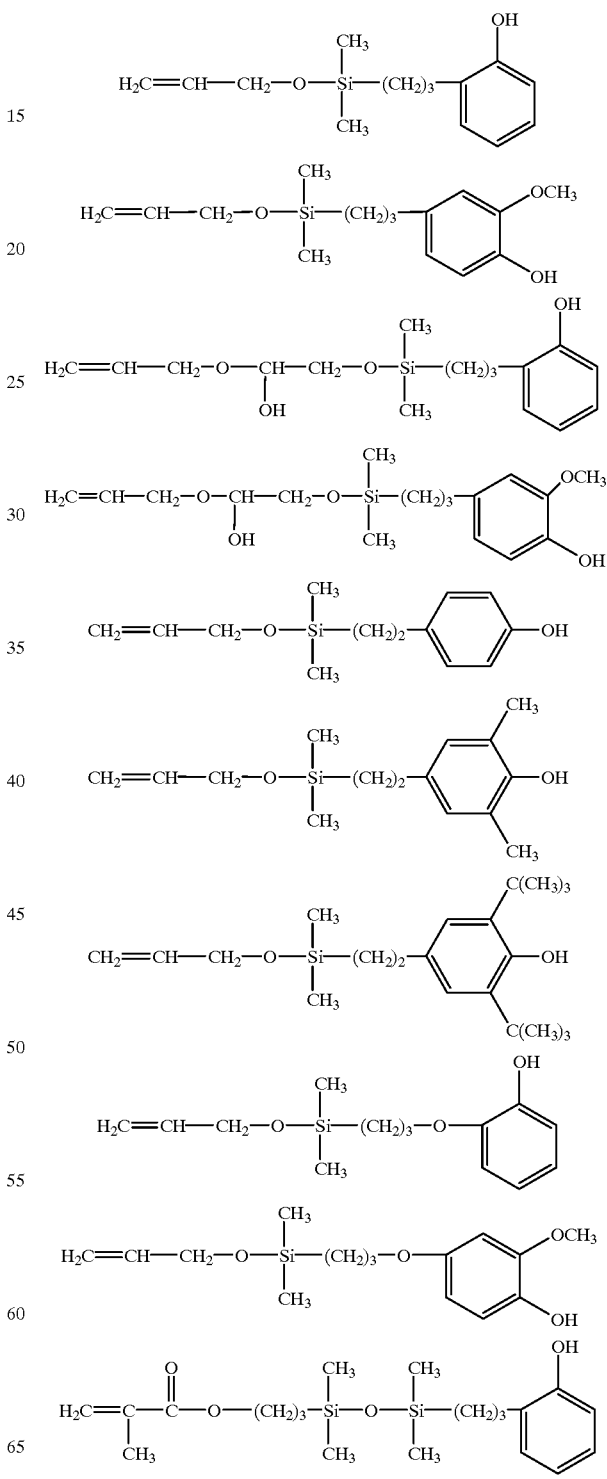

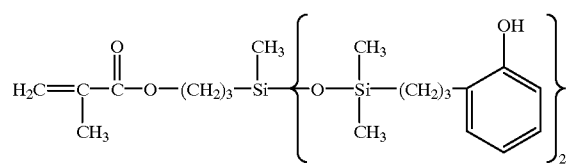
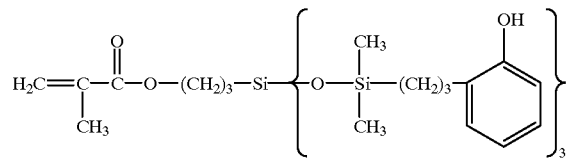
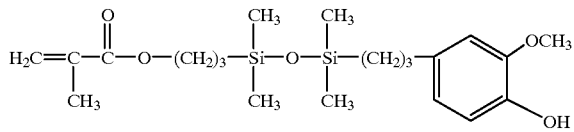
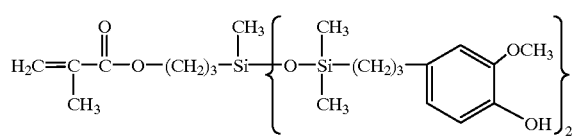
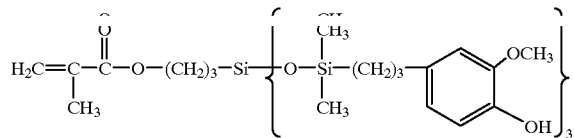
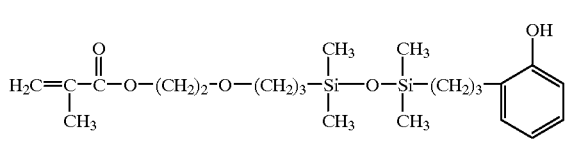
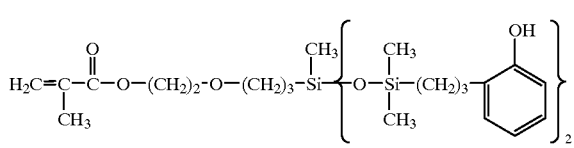
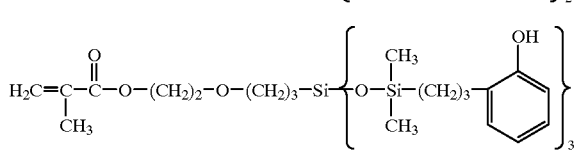
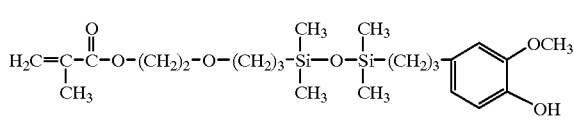
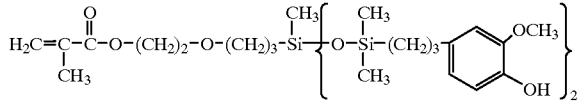
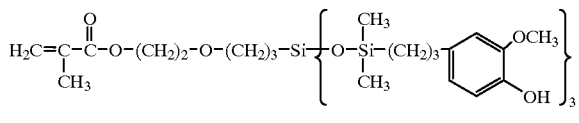
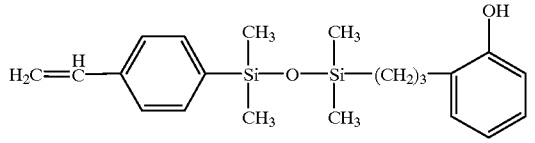
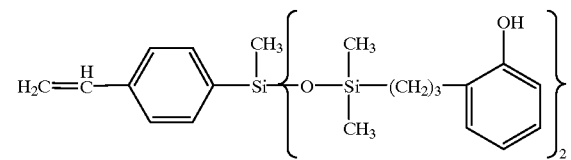
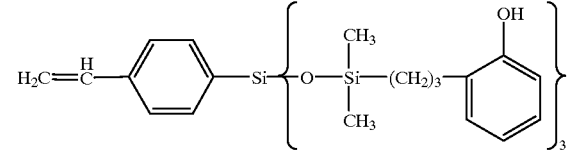
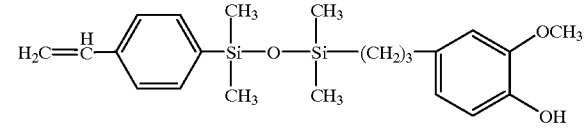
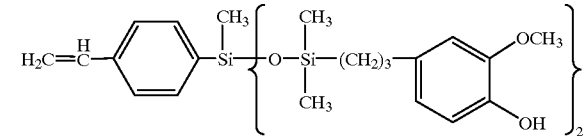
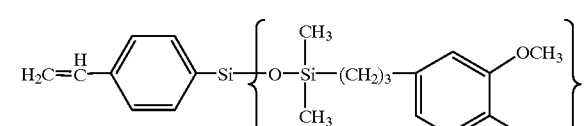
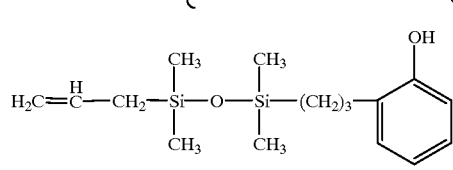
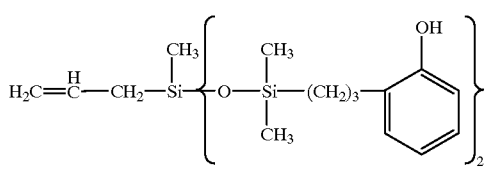
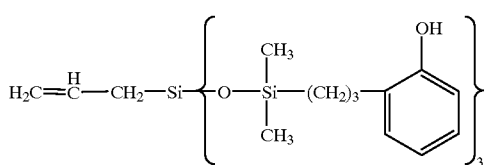
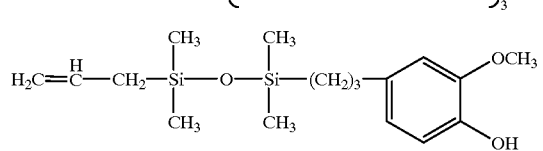
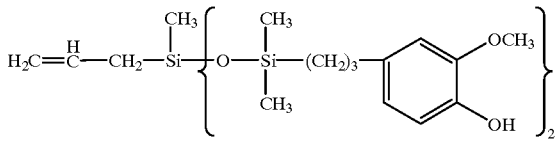
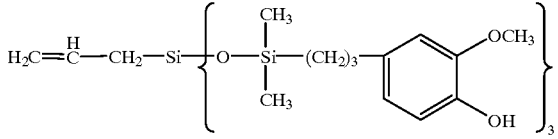

-continued

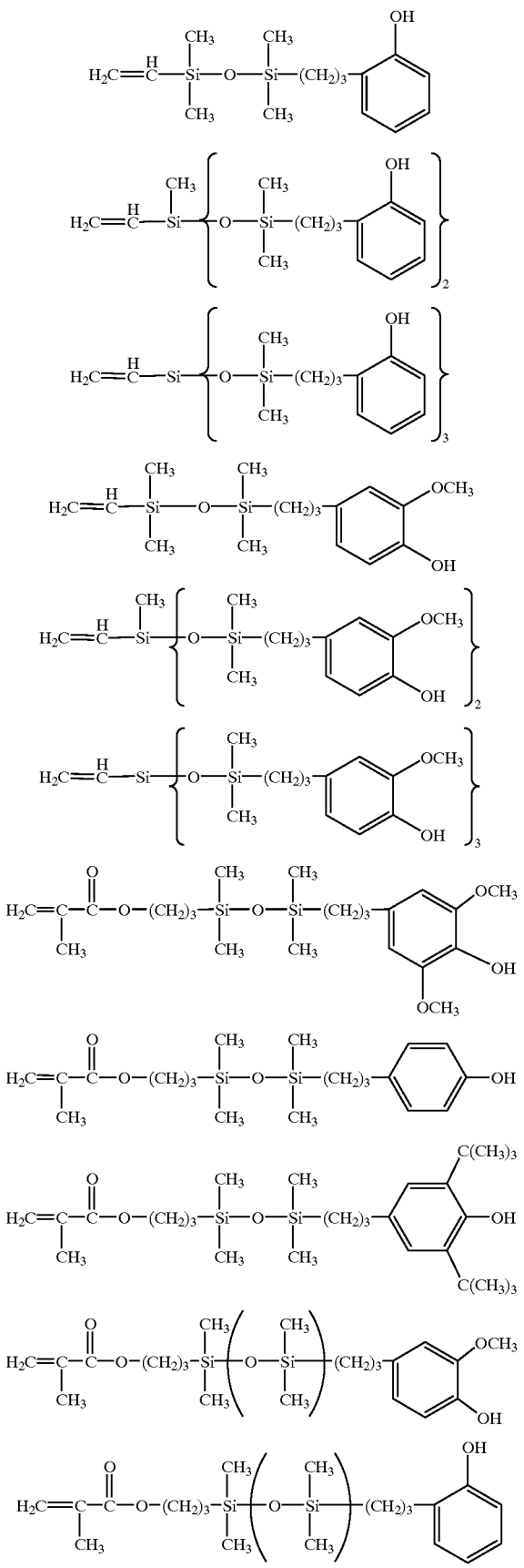
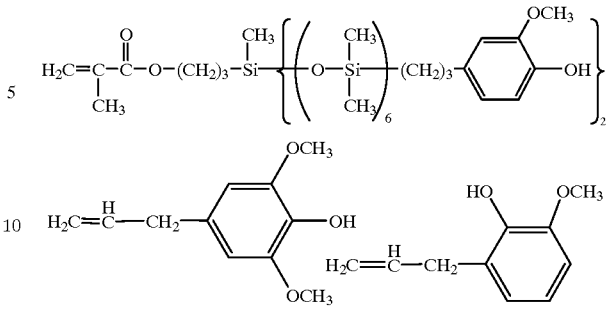

The concentration of component (B) in the composition of this invention is preferably from 0.01 to 50 weight parts and more preferably from 1 to 20 weight parts, in each case per 100 weight parts of component (A). The use of less than 0.01 weight part of component (B) results in a reduced post-cure adherence by the composition to various substrates, e.g., thermosetting resins, metals, and glasses. The use of more than 50 weight parts results in a reduction in physical properties of the cured product.

Component (C) of the present invention is a hydrosilylation catalyst that initiates the hydrosilylation reaction between the silicon-bonded hydrogen atoms and alkenyl groups in component (A). Known hydrosilylation catalysts can be used as component (C), which are specifically exemplified by platinum compounds such as chloroplatinic acid and its alcohol solutions, olefin complexes of platinum, diketone complexes of platinum, acetylacetate complexes of platinum, and complexes of platinum with vinyl-functional siloxane. In addition to platinum compounds, this catalyst is also exemplified by rhodium compounds such as the triphenylphosphine complex of rhodium; palladium compounds such as the tetrakis(triphenylphosphine)palladium complex; radical generators such as peroxides and azo compounds; and compounds of ruthenium, iridium, iron, cobalt, manganese, zinc, lead, aluminum, and nickel. Depending on the particular circumstances, a single catalyst can be used or two or more different catalysts can be used in combination. Among the various possibilities, the use of platinum compounds is optimal due to their excellent activity in the reaction under consideration.

Component (C) is typically present in a catalytic quantity, which is the smallest amount sufficient for inducing the addition reaction. In the case of platinum compounds, component (C) is preferably present in a concentration of from 0.01 to 1,000 weight parts as platinum metal per 1,000,000 weight parts of component (A) and more preferably from 0.1 to 100 weight parts as platinum metal per 1,000,000 weight parts of component (A).

The composition of this invention, which comprises components (A) to (C) as described above, may also contain a compound that inhibits the hydrosilylation reaction to improve the storage stability of the composition. Compounds known in the art may be used as a reaction inhibitor. Examples of inhibitors include, but are not limited to, phosphorus compounds such as triphenylphosphine; nitrogenous compounds such as tributylamine, tetramethylethylenediamine, and benzotriazole; sulfur-containing compounds; acetylenic compounds; compounds that contain at least 2 alkenyl groups; alkynyl-functional compounds; hydroperoxy compounds; and maleic acid derivatives. The following are preferred inhibitors: diesters of maleic acid, compounds that contain both alkynyl and alcoholic hydroxyl in the individual molecule, compounds that contain 2 or more alkynyl groups in the individual molecule, and compounds that contain at least 2 alkenyl groups, e.g., 1,3-divinyl-1,1,3,3-tetramethyldisiloxane.

If the concentration of the inhibitor is too low, the inhibitor will fail to inhibit the hydrosilylation reaction. On the other hand, if the concentration of the inhibitor is too high, the inhibitor will inhibit even the cure itself. Taking these factors into consideration, the concentration of the inhibitor is preferably from 0.1 to 50,000 weight parts for each 1,000,000 weight parts of the sum of components (A) and (B).

In addition to an inhibitor, the composition of this invention can also contain an adhesion promoter known in the art for the purpose of improving the adherence to, for example, metals and glasses.

The instant composition can also contain an organohydrogensiloxane having at least 2 silicon-bonded hydrogen atoms (SiH) in order to offset the alkenyl groups in component (B) with SiH. This organohydrogensiloxane can have a straight-chain, cyclic, network, or star molecular structure and may range from an oligomer up to and including high molecular weight polymers. The non-SiH silicon-bonded groups in this organohydrogensiloxane are preferably monovalent hydrocarbon groups free of aliphatic unsaturation. Examples of monovalent hydrocarbon groups include, but are not limited to, alkyl such as methyl, ethyl, propyl, butyl, pentyl, and hexyl; aryl such as phenyl, tolyl, and xylyl; and aralkyl such as benzyl and phenethyl. However, this organohydrogensiloxane may also contain small amounts of hydroxyl, alkoxy, haloalkyl, and so forth within a range that does not impair the objects of this invention. Viewed from the perspective of economics and ease of acquisition, methyl preferably makes up at least half of the silicon-bonded groups in the organohydrogensiloxane under consideration.

The organohydrogensiloxane is exemplified by trimethylsiloxy-endblocked methylhydrogenpolysiloxane; trimethylsiloxy-endblocked dimethylsiloxane-methylhydrogensiloxane copolymers; timethylsiloxy-endblocked diphenylsiloxane-methylhydrogensiloxane copolymers; dimethylsiloxy-endblocked dimethylsiloxane-methylhydrogensiloxane copolymers; cyclic methylhydrogenpolysiloxanes; copolymer resins composed of $SiO_{4/2}$ siloxane units and

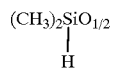

siloxane units; and copolymer resins composed of $SiO_{4/2}$ siloxane units, $(CH_3)_3SiO_{1/2}$ siloxane units, and

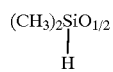

siloxane units.

The composition of this invention can also contain pigments for the purpose of imparting color, reinforcing fillers for the purpose of improving the strength, plasticizers for the purpose of improving the melting behavior upon heating and the processability, additives for the purpose of improving thermal conductivity, and fillers for the purpose of improving electrical conductivity.

The composition of this invention cures rapidly to form a cured gel or resin product when, for example, it is coated on a substrate surface and heated at 50 to 250° C. and preferably at 110 to 230° C. The cured product obtained in this manner will generally have a durometer (JIS A rubber durometer) from 1 to 100 and preferably from 10 to 90.

A unified article according to the present invention comprises a substrate and a cured product of the organopolysiloxane composition described above. The substrate is unified into a single, integral body with the cured product. A variety of substrates are suitable in the unified articles, such as organic resins like phenolic resins, epoxy resins, polybutylene terephthalate resins, and polycarbonate resins; metals such as copper, aluminum, and stainless steel; glasses; carbon fibers; and metal oxides. Unified articles of this invention can be fabricated by coating the composition of this invention on the surface of any of the various substrates and thermosetting at 50 to 250° C., or by coating and curing an organic resin onto the already cured product of the composition of this invention. In terms of its configuration, the unified article can, for example, comprise the cured product from the composition of this invention bonded on the surface of the substrate, or can comprise two substrates bonded to each other by cured product from the composition of this invention.

A characteristic feature of the curable organopolysiloxane composition of this invention is that the very small amount of silicone component that effuses from the composition also undergoes a thorough cure when the composition coated on the substrate surface is heated. This results in the production of a unified article in which the cured product is solidly bonded with the substrate. This characteristic feature makes the composition of this invention well suited for use as, for example, a silicone system adhesive.

The curable organopolysiloxane composition of this invention, because it comprises the components (A), (B), and (C) as described hereinabove, is characterized by an excellent curability, and in particular the silicone component that out-migrates in a very small amount by effusion from the composition prior to and during its cure is also highly curable and produces a cured product that can tightly adhere to a variety of substrates.

EXAMPLES

This invention is explained in greater detail in the following examples. The viscosity values reported in the examples were measured at 25° C.

Reference Example 1

25.6 g (36.9 mmol) of a vinyldimethylsiloxy-endblocked polydimethylsiloxane having the formula:

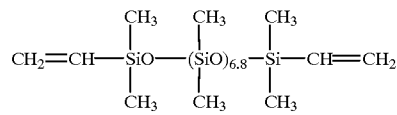

880.2 g (2.97 mol) octamethylcyclotetrasiloxane, 8.8 g (36.8 mmol) 1,3,5,7-tetramethylcyclotetrasiloxane, and 0.54 g (3.6 mmol) trifluoromethanesulfonic acid were introduced into a 1-liter flask equipped with a stirrer, thermometer, and condenser and were heated at 80 to 90° C. for 9 hours while stirring. The silicon-bonded hydrogen/vinyl molar ratio in this reaction mixture was 2. After stirring had been stopped, the reaction mixture was cooled to room temperature and neutralized by the addition of 0.54 g (7.3 mmol) diethylamine. The low boilers were then distilled from the reaction mixture by heating at 100° C. under reduced pressure followed by filtration of the salt by-product to give 767 g of a colorless and transparent polymer. This polymer was subjected to an additional stripping of the low boilers in a thin-film distillation apparatus at 200° C./1 mmHg to yield 740 g of a colorless and transparent polymer. Analysis of this polymer by gel permeation chromatography (GPC) showed it to have a number-average molecular weight of 17,842, a dispersity of 2.00, and a peak area ratio of 100%. Low-molecular-weight siloxane was not detected in this polymer. Analysis by $^{29}$Si-NMR confirmed this polymer to be a vinyl- and SiH-functional organopolysiloxane having the average formula:

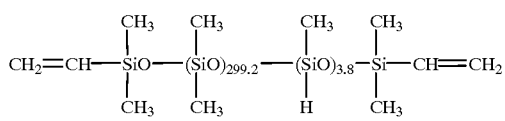

The silicon-bonded hydrogen/vinyl molar ratio in this organopolysiloxane was 1.9.

Reference Example 2

1500 mL acetone was added to 720 g of the organopolysiloxane synthesized in Reference Example 1 and the mixture was stirred for 30 minutes. This was followed by standing for 1 hour, after which the upper layer was separated off. The lower layer remaining after this process had been repeated an additional two times was then heated under reduced pressure to distill off the low boilers. The result was 669 g of a colorless and transparent polymer. GPC analysis of this polymer showed it to have a number-average molecular weight of 30,491, a dispersity of 1.50, and a peak area ratio of 100%. Low-molecular-weight siloxane was not detected in this polymer. Analysis by $^{29}$Si-NMR confirmed this polymer to be a vinyl- and SiH-functional organopolysiloxane having the formula:

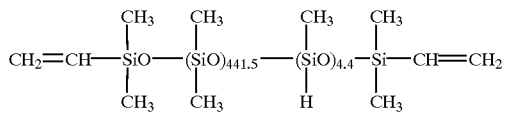

The silicon-bonded hydrogen/vinyl molar ratio in this organopolysiloxane was 2.2.

Reference Example 3

6.86 g (36.9 mmol) 1,3-divinyltetramethyldisiloxane, 908.7 g (3.07 mol) octamethylcyclotetrasiloxane, and 0.18 g (3.2 mmol) potassium hydroxide were introduced into a 1-liter flask equipped with a stirrer, thermometer, and condenser and were heated for 10 hours at 150 to 160° C. while stirring. After stirring had been stopped, the reaction mixture was cooled to room temperature and neutralized by the addition of 0.88 g (7.3 mmol) vinyldimethylchlorosilane. The low boilers were then distilled from the reaction mixture by heating at 150° C. under reduced pressure followed by filtration of the salt by-product to give a colorless and transparent polymer. This polymer was subjected to an additional stripping of the low boilers in a thin-film distillation apparatus at 200° C./1 mmHg to yield 740 g of a colorless and transparent polymer. GPC analysis of this polymer showed it to have a number-average molecular weight of 24,125, a dispersity of 1.67, and a peak area ratio of 100%. Low-molecular-weight siloxane was not detected in this polymer. A vinyl content of 0.22 weight % was determined by titrimetry using iodine monochloride, which indicated this polymer to be a vinyl-functional organopolysiloxane having the formula:

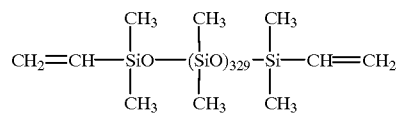

Reference Example 4

720 g of the organopolysiloxane synthesized in Reference Example 3 was subjected to acetone extraction as described in Reference Example 2. This yielded 660 g of a colorless and transparent polymer. GPC analysis of this polymer showed it to have a number-average molecular weight of 27,471, a dispersity of 1.50, and a peak area ratio of 100%. Low-molecular-weight siloxane was not detected in this polymer. A vinyl content of 0.20 weight % was determined by titrimetry using iodine monochloride, which indicated this polymer to be a vinyl-functional organopolysiloxane having the formula:

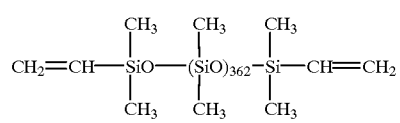

Example 1

A curable organopolysiloxane composition was prepared by blending the following: 31.59 g (silicon-bonded hydrogen content=4.2 mmol, silicon-bonded vinyl content=1.9 mmol) of the organopolysiloxane synthesized in Reference Example 2, 4.01 g hexamethyldisilazane-treated fumed silica (Aerosil 200BX from Nippon Aerosil), 5.5 mg phenylbutynol, 0.121 g (vinyl content=0.3 mmol) reaction product of 3-glycidoxypropyltrimethoxysilane and silanol-endblocked dimethylsiloxane-methylvinylsiloxane copolymer, 4.42 g (vinyl content=15.8 mmol) of a hydroxyphenyl-functional organosilicon compound having the formula:

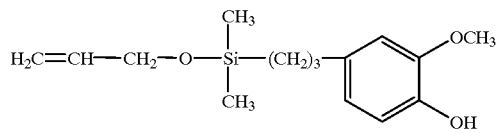

1.11 g (silicon-bonded hydrogen content=17.5 mmol) trimethylsiloxy-endblocked methylhydrogenpolysiloxane, and sufficient chloroplatinic acid/1,3-divinyltetramethyldisiloxane complex to provide 1.7 ppm platinum metal calculated on the composition as a whole. The molar ratio in this composition of the silicon-bonded hydrogen in the trimethylsiloxy-endblocked methylhydrogenpolysiloxane to the aliphatically unsaturated bonds in the hydroxyphenyl-functional organosilicon compound was 1.2, The resulting curable organopolysiloxane composition was coated on a silicon chip (10 mm×10 mm×1 mm) so as to produce a disk and was cured by holding for 30 minutes in a 180° C. oven. The rubber durometer of the resulting cured organopolysiloxane was 37 when measured using a JIS type A rubber durometer.

A cured organopolysiloxane/silicon chip/epoxy resin unified article was then fabricated by applying a curable epoxy resin composition so as to overcoat the cured organopolysiloxane and by thereafter curing the epoxy resin by holding for 1 hour in a 180° C. oven. The curable epoxy resin composition used for overcoating was composed of 50 parts Epotote YDF8170 from Toto Kasei Kabushiki Kaisha, 20 parts Novacure HX-3721 from Asahi Kasei Kogyo Kabushiki Kaisha, and 30 parts Noclac NS5 from Ouchi Shinko Kagaku Kogyo Kabushiki Kaisha. When the resulting unified article was inspected with an ultrasonic flaw detector, no debonding or delamination was observed at the respective interfaces formed by the epoxy resin, cured organopolysiloxane, and silicon chip, nor at the interface where the three substances were in contact (interface D in FIG. 1, location of the outmigrated silicone component fraction). These observations confirmed that the cured organopolysiloxane was in fact strongly adherent and in particular that the silicone component outmigrated by effusion was also well bonded. These results are reported in FIG. 1 and Table 1.

Comparative Example 1

A curable organopolysiloxane composition was prepared by blending the following: 110.54 g of the organopolysiloxane synthesized in Reference Example 4, 14.03 g hexamnethyldisilazane-treated fumed silica (Aerosil 200BX from Nippon Aerosil), 42 mg phenylbutynol, 0.419 g reaction product of 3-glycidoxypropyltrimethoxysilane and silanol-endblocked dimethylsiloxane-methylvinylsiloxane copolymer, 15.48 g of a hydroxyphenyl-functional organosilicon compound having the formula:

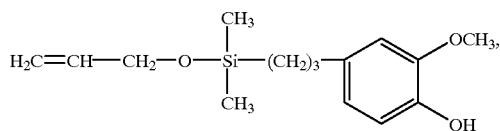

4.57 g (silicon-bonded hydrogen content=72.2 mmol) trimethylsiloxy-endblocked methylhydrogenpolysiloxane, and sufficient chloroplatinic acid/1,3-divinyltetramethyldisiloxane complex to provide 1 ppm platinum metal calculated on the composition as a whole. The molar ratio in this composition of the silicon-bonded hydrogen in the trimethylsiloxy-endblocked methylhydrogenpolysiloxane to the vinyl group in the hydroxyphenyl-functional organosilicon compound was 1.1. This composition was cured as in Example 1 to yield a cured organopolysiloxane with a rubber durometer of 37 when measured using a JIS type A rubber durometer. A cured organopolysiloxane/silicon chip/epoxy resin unified article was also fabricated as described in Example 1. When the resulting unified article was inspected with an ultrasonic flaw detector, no debonding or delamination was observed at the epoxy resin/cured organopolysiloxane interface or at the silicon chip/cured organopolysiloxane interface (interfaces A and C in FIG. 1). However, delamination was observed at the interface where the three substances were in contact (interface D in FIG. 1, location of the outmigrated silicone component fraction). These observations confirmed that the outmigrated fraction was inadequately adherent. These results are reported in FIG. 1 and Table 1.

Comparative Example 2

A curable organopolysiloxane composition was prepared by blending the following: 9.90 g of the organopolysiloxane synthesized in Reference Example 1, 1.00 mg phenylbutynol, 45 mg reaction product of 3-glycidoxypropyltrimethoxysilane and silanol-endblocked dimethylsiloxane-methylvinylsiloxane copolymer, and sufficient chloroplatinic acid/1,3-divinyltetramethyldisiloxane complex to provide 5 ppm platinum metal calculated on the composition as a whole. Using this composition, a cured organopolysiloxane/silicon chip/epoxy resin unified article was fabricated as described in Example 1 using the curing conditions described in Example 1. When the resulting unified article was inspected with an ultrasonic flaw detector, no debonding or delamination was observed at the silicon chip/cured organopolysiloxane interface (interface C in FIG. 1). However, delamination was observed at the epoxy resin/cured organopolysiloxane interface and at the interface where the three substances were in contact (interfaces A and D in FIG. 1). These observations confirmed that in this case the composition itself was inadequately adherent. These results are reported in FIG. 1 and Table 1.

Example 2

A curable organopolysiloxane composition was prepared by blending the following: 31.59 g (silicon-bonded hydrogen content=4.2 mmol, silicon-bonded vinyl content=1.9 mmol) of the organopolysiloxane synthesized in Reference Example 2, 4.01 g hexamethyldisilazane-treated fumed silica (Aerosil 200BX from Nippon Aerosil), 5.5 mg phenylbutynol, 0.121 g (vinyl content=0.3 mmol) reaction product of 3-glycidoxypropyltrimethoxysilane and silanol-endblocked dimethylsiloxane-methylvinylsiloxane copolymer, 4.00 g (vinyl content=24.4 mmol) eugenol, 1.73 g (silicon-bonded hydrogen content=27.2 mmol) trimethylsiloxy-endblocked methylhydrogenpolysiloxane, and sufficient chloroplatinic acid/1,3-divinyltetramethyldisiloxane complex to provide 1.8 ppm platinum metal calculated on the composition as a whole. The molar ratio in this composition of the silicon-bonded hydrogen in the trimethylsiloxy-endblocked methylhydrogenpolysiloxane to the aliphatically unsaturated bonds in the eugenol and (3-glycidoxypropyltrimethoxysilane+silanol-endblocked dimethylsiloxane-methylvinylsiloxane copolymer) reaction product was 1.1. The resulting curable organopolysiloxane composition was coated on a silicon chip (10 mm×10 mm×1 mm) so as to produce a disk and was cured by holding for 30 minutes in a 150° C. oven. The rubber durometer of the resulting cured organopolysiloxane was 39 when measured using a JIS type A rubber durometer.

A cured organopolysiloxane/silicon chip/epoxy resin unified article was then fabricated by applying a curable epoxy resin composition so as to overcoat the cured organopolysiloxane and by thereafter curing the epoxy resin by holding for 1 hour in a 180° C. oven. The curable epoxy resin composition used for overcoating was composed of 50 parts Epotote YDF8170 from Toto Kasei Kabushiki Kaisha, 20 parts Novacure HX-3721 from Asahi Kasei Kogyo Kabushiki Kaisha, and 30 parts Noclac NS5 from Ouchi Shinko Kagaku Kogyo Kabushiki Kaisha. When the resulting unified article was inspected with an ultrasonic flaw detector, no debonding or delamination was observed at the respective interfaces formed by the epoxy resin, cured organopolysiloxane, and silicon chip, nor at the interface where the three substances were in contact (interface D in FIG. 1, location of the outmigrated silicone component fraction). These observations confirmed that the cured organopolysiloxane was in fact strongly adherent and in particu lar that the silicone component outmigrated by effusion was also well bonded. These results are reported in FIG. 1 and Table 1.

TABLE 1

| Interface designation | Example 1 | Example 2 | Comparative Example 1 | Comparative Example 2 |
| --- | --- | --- | --- | --- |
| A | bonded | bonded | bonded | delaminated |
| B | bonded | bonded | bonded | bonded |
| C | bonded | bonded | bonded | bonded |
| D | bonded | bonded | delaminated | delaminated |

That which is claimed is:

1. A curable organopolysiloxane composition, comprising:

(A) an organopolysiloxane containing an average of at least 2 alkenyl groups and at least 2 silicon-bonded hydrogen atoms per molecule;

(B) a compound containing alkenyl and hydroxyphenyl groups in each molecule, and (C) a hydrosilylation catalyst.

2. The curable organopolysiloxane composition according to claim 1, wherein component (A) is a liquid organopolysiloxane having a viscosity of from 100 to 1000,000 mPa·s at 25° C. and wherein the organopolysiloxane has a straight-chain or branched structure.

3. The curable organopolysiloxane composition according to claim 1, wherein the alkenyl groups have a terminal double bond.

4. The curable organopolysiloxane composition according to claim 1, wherein component (A) contains from 0.025 to 5 mole % of silicon bonded alkenyl groups, 0.025 to 5 mole % of silicon-bonded hydrogen atoms, and wherein the ratio of the number of silicon-bonded hydrogen atoms to the number of silicon-bonded alkenyl groups in component (A) is from 0.3 to 20.

5. The curable organopolysiloxane composition according to claim 1, wherein the organopolysiloxane further contains monovalent hydrocarbon groups.

6. The curable organopolysiloxane composition according to claim 5, wherein at least 50% of the monovalent hydrocarbon groups are methyl.

7. The curable organopolysiloxane composition according to claim 1, wherein component (B) is an organosilicon compound having the formula:

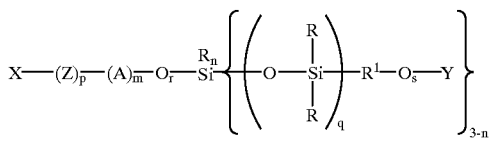

wherein X is an alkenyl group; Z is an ester group or a phenylene group; A is a divalent hydrocarbon group containing at least 1 carbon atom or a group having the formula —$R^2$—O—$R^2$— wherein $R^2$ is a divalent hydrocarbon group; each R is independently a monovalent hydrocarbon group free of aliphatic unsaturation; each $R^1$ is independently a divalent hydrocarbon group free of aliphatic unsaturation and containing at least 2 carbon atoms; Y is a substituted or unsubstituted hydroxyphenyl group; m, p, r, and s are each 0 or 1; n is 0 to 2; and q is an integer from 0 to 7.

8. The curable organopolysiloxane composition according to claim 7, wherein Y is 2-hydroxyphenyl or 4-hydroxy-3-methoxyphenyl.

9. The curable organopolysiloxane composition according to claim 7, wherein n is from 1 to 2 and q is from 0 to 4.

10. The curable organopolysiloxane composition according to claim 1, wherein component (B) has a concentration of from 0.01 to 50 parts by weight per 100 parts by weight of component (A).

11. The curable organopolysiloxane composition according to claim 1, wherein the hydrosilylation catalyst is a platinum compound.

12. The curable organopolysiloxane composition according to claim 1, further comprising an inhibitor.

13. The curable organopolysiloxane composition according to claim 1, further comprising an organohydrogensiloxane having an average of at least two silicon-bonded hydrogen atoms per molecule.

14. The curable organopolysiloxane composition according to claim 13, wherein the organohydrogensiloxane further contains monovalent hydrocarbon groups free of aliphatic unsaturation.

15. The curable organopolysiloxane composition according to claim 14, wherein at least 50% of the monovalent hydrocarbon groups are methyl.

16. A product formed by curing the organopolysiloxane composition of claim 1.

17. A product formed by curing the organopolysiloxane composition of claim 7.

* * * * *